（12）United States Patent
Beadie et al.

(10) Patent No.: US 8,659,834 B2
(45) Date of Patent: Feb. 25, 2014

(54) ACHROMATIC GRADIENT INDEX SINGLET LENS

(75) Inventors: Guy Beadie, Falls Church, VA (US); Erin F. Fleet, Springfield, VA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 117 days.

(21) Appl. No.: 13/493,439

(22) Filed: Jun. 11, 2012

(65) Prior Publication Data

US 2013/0003186 A1 Jan. 3, 2013

Related U.S. Application Data

(60) Provisional application No. 61/502,560, filed on Jun. 29, 2011.

(51) Int. Cl.
*G02B 3/00* (2006.01)
(52) U.S. Cl.
CPC .................................... *G02B 3/0087* (2013.01)
USPC .......................................... 359/652; 264/1.1
(58) Field of Classification Search
USPC .................................. 359/652–655
See application file for complete search history.

(56) References Cited

U.S. PATENT DOCUMENTS

| | | | |
|---|---|---|---|
| 5,448,409 A * | 9/1995 | Noda ............................ | 359/654 |
| 5,912,770 A | 6/1999 | Tsuchida | |
| 7,002,754 B2 | 2/2006 | Baer et al. | |

* cited by examiner

*Primary Examiner* — William Choi
(74) *Attorney, Agent, or Firm* — US Naval Research Laboratory; Stephen T. Hunnius

(57) ABSTRACT

A method of making an achromatic gradient index singlet lens comprising utilizing a gradient index material with a curved front surface in which light does not follow a straight line as it travels through the material and wherein different color rays traverse different curved paths, utilizing the natural dispersion of the curved front surface as a strong positive lens, and developing a weakly diverging GRIN distribution within the lens to balance the chromatic aberrations of the curved front surface.

7 Claims, 2 Drawing Sheets

ACHROMATIC GRADIENT INDEX SINGLET LENS

This application claims priority to and benefit of U.S. Patent Application No. 61/502,560 filed Jun. 29, 2011, the entirety of which is herein incorporated by reference.

BACKGROUND

This disclosure provides a method of designing and manufacturing an optical lens which focuses equally over a large range of colors.

The current state of the art requires two lens elements for this purpose.

This disclosure describes a way to succeed with one lens. This achromatic gradient index singlet lens has the potential of reducing the lens count in multi-element imaging systems by up to a factor of two.

The material property that allows a lens to bend light is the refractive index. The higher the refractive index contrast between two materials, the more light will bend at a curved interface between them. A near-universal property of the refractive index for optical materials is that its value changes as a function of the color, or wavelength, of light.

Constant-index materials are achieved only in manmade, highly artificial materials such as photonic bandgap structures—materials probably unsuited for imaging optics in the foreseeable future.

The variation of refractive index as a function of wavelength is referred to as optical dispersion. A highly-dispersive material is one whose index of refraction changes greatly as a function of wavelength.

Because of material dispersion, lenses do not focus light of different colors equally. This presents a problem for imaging. Imaging an object onto film or a camera sensor requires the optical system to bring all colors into focus together. The typical way to do this is to use lenses made of different materials, with different dispersive properties.

An achromatic doublet is the simplest example of how one can focus light of different colors to the same point. This optic consists of two lenses cemented together. One lens is strongly focusing, fabricated from a glass with weak dispersion. The second lens is a negative lens, which means that it weakens the focusing from the first lens, but is designed so that the overall two-lens system still focuses light. One aspect is that the negative lens is made from a highly dispersive material. The amount of wavelength-dependent focusing depends both on the strength of the lens and the dispersiveness of the material. So, by balancing a strongly-focused lens with weak dispersion by a weak, negative lens (which bends the colors the other way) with strong dispersion, one can have balanced chromatic performance in a lens that is still a positive, focusing lens.

BRIEF SUMMARY OF THE INVENTION

This disclosure provides a method of designing and manufacturing an optical lens which focuses equally over a large range of colors.

The current state of the art requires two lens elements for this purpose.

This disclosure describes a way to do it with one lens.

This achromatic gradient index singlet lens has the potential of reducing the lens count in multi-element imaging systems by up to a factor of two.

This disclosure provides an alternative means of correcting chromatic aberrations, one which does not require two separate lenses to achieve this goal. The ability to produce achromats from a single optic enables one to replace two lenses with just one. In the competitive realm of compact, high-quality optics, any reduction in the number of elements provides the opportunity to produce smaller, lighter optical systems for a variety of military and commercial applications.

DETAILED DESCRIPTION

Figure 1:
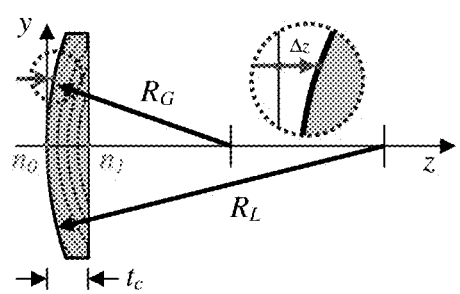
FIG. 1 illustrates a GRIN lens geometry. The front surface is spherical, the back planar. Refractive index contours have a common origin a distance $R_G$ from the left vertex. Surface curvature is given by $R_L$. The index varies linearly along the optic axis from $n_0$ to $n_1$.

The method disclosed employs gradient index materials—materials with a refractive index which is not constant within a lens substrate. While there are several ways to manufacture gradient index lenses, a NRL patent, U.S. Pat. No. 7,002,754B2, provides a technique of fabricating polymer-based gradient index lenses. In this technique, thin polymer films are first extruded from two base polymers. Since the weight fraction can be arbitrarily set during the extrusion process, the resultant thin films can have an index of refraction variably chosen anywhere between the indices of the base polymers. A large number of material production runs results in a "library" of thin plastic films with different refractive indices, inexpensively made and in large quantity. With a large set of thin films to choose from, finished optics can be assembled and molded in a variety of shapes.

The primary effect of gradient index, or GRIN, materials is that light does not follow a straight line within them. Light rays bend towards higher indices, like satellites bend towards objects of higher mass. A secondary effect, as in homogeneous lenses, is that different-color rays traverse different curved paths.

In this disclosure we take advantage of that fact to create an achromatic "doublet" in a single element. We use the natural dispersion of a curved surface as our strong, positive lens, and develop a weakly-diverging GRIN distribution within the optic to balance the chromatic aberrations of the front surface. The surface and the gradient index are not necessarily independent, but the basic idea still serves as a guide for optical design.

To understand how the GRIN achromat is designed, and why it works, the concept of an optical wavefront must be introduced. The wavefront is a conceptual surface, on which the phase of light is a constant. It is also, therefore, called the phasefront. The direction of light propagation is locally perpendicular to the wavefront. Thus, a planar wavefront will describe the propagation of a collimated plane wave, while curved wavefronts describe either focusing or diverging light. Just as light emitted from a perfect point source is emitted spherically, so too does a spherical wavefront collapse to a point if propagating inward.

This is why simple lenses work. Collimated light illuminating a lens starts out with a planar wavefront. The center of a focusing lens, however, is thicker than the edges. Because light travels more slowly through the lens material than air, light at the center lags behind the light at the edge. This distorts the wavefront into a curved surface, with the center stretched behind the edges. The more spherical the resulting wavefront, the better the light will focus down to a point behind the lens. This point, the focal point, lies at the center of the wavefront sphere.

To model the effect of a GRIN lens, therefore, we must calculate the wavefront shape which is imposed upon an incident plane wave. Furthermore, since we are interested in achromatic lenses, we must calculate the wavefront for multiple wavelengths and attempt to make it equally spherical for different colors. The following sections develop an approximate expression for the wavefront. Raytrace calculations in commercial software (Zemax) prove that designs based on this expression work as achromats, proving the validity of the invention disclosure. These designs can be used as predicted, as well as serve as starting points for further refinements.

To develop the approximation, we choose a specific type of GRIN lens—a plano-convex lens cut from a gradient index material which varies linearly as a function of radius from some point considered outside the lens outline. It should be noted that these characteristics are chosen primarily for the ease of their analysis. They should in no way limit the scope of the proposed idea, which should be extended to cover the usual variations in surface shape (convex, concave, conic, or otherwise aspheric) as well as other possible gradient index distributions.

The distribution considered here is spherically symmetric, and linear in the radial coordinate. Other variations may also be spherically symmetric, but nonlinear in the radial coordinate. Such variations could be polynomial in nature, trigonometric, composed of rational functions, or even discontinuous discrete functions. Still other distributions may not be spherically symmetric at all. The contours of constant index may be conic or otherwise aspheric.

All of these variations serve as fertile ground in which to identify refinements and alternative solutions. For the purpose of describing the idea, however, we once again restrict ourselves to the simpler case of a plano-convex lens with a spherical gradient index distribution, varying linearly as a function of radius from some center of symmetry located on the plano-convex optical axis, but well outside the lens boundaries.

We now calculate the wavefront in the thin-lens approximation. In this approximation, it is assumed the lens is thin enough that the phase accumulated by a ray of light passing through the lens can be calculated without accounting for light bending inside the lens. Thus, the height of a ray exiting the lens is considered to be the same as the input height. In practice this is a very good approximation for lenses that are not too strongly focused.

The optical phase delay $\Phi$ experienced by a ray traversing a medium along the z axis is given by:

$$\phi(y) = \int_0^{tc} k_o n(y, z) dz \tag{1}$$

where the ray height y is assumed constant, the path goes from z=0 to z=tc, $k_o$ is the magnitude of the wavevector of light ($k_o = 2\pi/\lambda$), and n(y,z) is the index of refraction at position y,z. The ray path from the input plane to the surface of the lens is in air. Since n=1 in air, the partially-completed integral can be written $$\phi(y) = k_o \Delta z(y) + \int_{\Delta z(y)}^{tc} k_o n(y, z) dz \tag{2}$$

where $\Delta z(y)$ is the distance from the input plane to the spherical surface $$\Delta z(y) = R_L \pm \sqrt{R_L^2 - y^2} \tag{3}$$

and $R_L$ is the radius of curvature of the lens surface. $R_L > 0$ if it lies to the right of the lens, and $R_L < 0$ if it lies to the left. Inside the lens, we compute the distance r between (y,z) to the GRIN center of symmetry via $$r = \frac{R_G}{|R_G|} \sqrt{y^2 + (R_G - z)^2} \tag{4}$$

where $R_G$ is the distance from the vertex to the GRIN center of symmetry. As with the radius of curvature, $R_G > 0$ if it lies to the right of the lens, and $R_G < 0$ if it lies to the left. Once r is determined, the index is found from the linear relationship $$n(r) = n_o + a(r - R_G) \tag{5}$$

where $n_o$ is the index of refraction at the lens vertex. We point out here that the index of refraction $n_b$ at the back vertex of the lens, for center thickness $t_c$, is given by $n_b = n_o - at_c$. Therefore, another definition for a is: $(at_c) = (n_o - n_b)$.

Plugging these expressions into the equation for the phase integral, expanding them to order $y^4$, assuming $(R_L, R_G) \gg (y,z)$, and doing the integral over z results in:

$$\phi_{GRIN}(y) = \tag{6}$$

$$k_o \left( n_o t_c - \frac{at_c^2}{2} \right) - \frac{k_o}{2} \left( \frac{n_o - 1}{R_L} - \frac{at_c}{R_G} \right) y^2 + \frac{k_o}{4} \left( \frac{a}{2R_L^2} - \frac{a}{R_L R_G} \right) y^4$$

This should be compared to the expression for a perfect spherical wavefront which focuses at a position z=f:

$$\phi_f(y) = -k_o \sqrt{y^2 + f^2} \approx -k_o f \left[ 1 + \frac{y^2}{2f^2} \right] \tag{7}$$

from which we conclude that the GRIN phasefront should focus near $$f_{GRIN} \approx \left( \frac{n_o - 1}{R_L} - \frac{at_c}{R_G} \right)^{-1} \tag{8}$$

As expected, if there were no variation in the refractive index (a=0) then the calculated focal length is exactly what one would predict for a homogeneous plano-convex lens: namely, that $f = R_L/(n_o - 1)$.

Equation (8) predicts the focal length expected from a GRIN lens at one particular wavelength. The wavelength dependence comes in through the index parameters $n_o$ and a. The wavelength dependence of $n_o$ has already been discussed—this is just the dispersion of the material at the lens vertex. Not quite so obvious is the relationship between wavelength and a.

A gradient index necessarily means a gradient in the material composition of the lens. The material at the front of the lens differs, in general, from the material at the back of the lens. This suggests a change not only in the index value, but also the dispersion characteristics throughout the lens. This means that if the index difference between the front and back surfaces was 0.1 at some reference wavelength $\lambda_d$, then the index difference at some other wavelength may well be 0.15. A different index difference over the same thickness, however, requires a different value for a in Eqn. (5), which is how this parameter depends on wavelength.

The design of an achromatic GRIN requires that the two parameters vary in such a way as to leave the overall focal length $f_{GRIN}$ unchanged. For the focal lengths at two different wavelengths $\lambda_{red}$ and $\lambda_{blue}$ to be equal, the following relationship must hold:

$$\frac{1}{f_{blue}} - \frac{1}{f_{red}} = \frac{[n_o(\lambda_{blue}) - n_o(\lambda_{red})]}{R_L} - \frac{[n_o(\lambda_{blue}) - n_o(\lambda_{red})] - [n_b(\lambda_{blue}) - n_b(\lambda_{red})]}{R_G} \quad (9)$$

where we use Eqn. (8) twice and the relationship between a and the difference between the front index $n_o$ and back index $n_b$ of the lens mentioned after Eqn. (5). Thus, a lens with equal focal lengths at $\lambda_{red}$ and $\lambda_{blue}$ can be found provided $$R_L = R_G \frac{\Delta n_o}{\Delta n_o - \Delta n_b} \quad (10)$$

where we have adopted the shorthand $\Delta n = [n(\lambda_{blue}) - n(\lambda_{red})]$.

To explore the validity of Eqns. (8-10) and their ability to predict achromatic singlets, we simulated a series of GRIN lenses in Zemax®. To do this, we need to simulate material dispersion curves. A common method of classifying glasses it to specify the index $n_d$ at the Fraunhofer d-line wavelength (587.6 nm) and to describe dispersion with the "Abbe" number V, defined as $[n_d-1]/[n(\lambda_F)-n(\lambda_C)]$, where $\lambda_F$ and $\lambda_C$ are the F and C-line wavelengths 486.1 nm and 656.3 nm, respectively. In the series of simulated singlets, we fixed the gradient index radius of curvature $R_G$ to 20 mm and used Eqn. (10) to determine the proper surface curvature $R_L$ needed for chromatic balance. Using $n_{d,o}$ and $V_o$ to describe the front material and $n_{d,b}$ and $V_b$ to describe the back material, the balance condition and the d-line focal length become:

$$R_L = R_G \frac{1}{1 - \frac{V_b}{V_o}\frac{n_{d,o}-1}{n_{d,b}-1}} \quad (11)$$

$$f_d = \left(\frac{n_{d,o}-1}{R_L} - \frac{n_{d,o}-n_{d,b}}{R_G}\right)^{-1} \quad (12)$$

In the example presented here, $n_{d,o}$ and $V_o$ are 1.6 and 30, respectively, while $n_{d,b}$ and $V_b$ are 1.4 and 70. The Abbe number is a measure of optical dispersion, defined by $[n(\lambda_d)-1]/[n(\lambda_F)-n(\lambda_C)]$, where $\lambda_d$ is the d-line wavelength and $\lambda_F$, $\lambda_C$ are the F and C-line wavelengths 486.1 nm and 656.3 nm, respectively. Counter intuitively, the higher the Abbe number the lower the optical dispersion, so in this example the material at the front-surface vertex has both a higher index and higher dispersion than the material at the back surface vertex.

When constructed from these materials, assuming a linear variation of d-line index from one vertex to the other, the theory predicts chromatic balance for a lens $R_G$ equal to 20 mm and front surface curvature $R_L$ equal to 28 mm For comparison purposes, a plano-convex homogeneous lens was also modeled. The glass of the homogeneous lens was given a d-line index of 1.50 and Abbe number of 50. The front surface curvature was adjusted to give the same back focal length as the model GRIN lens. The back focal lengths of these lenses were near 85 mm.

Figure 2:
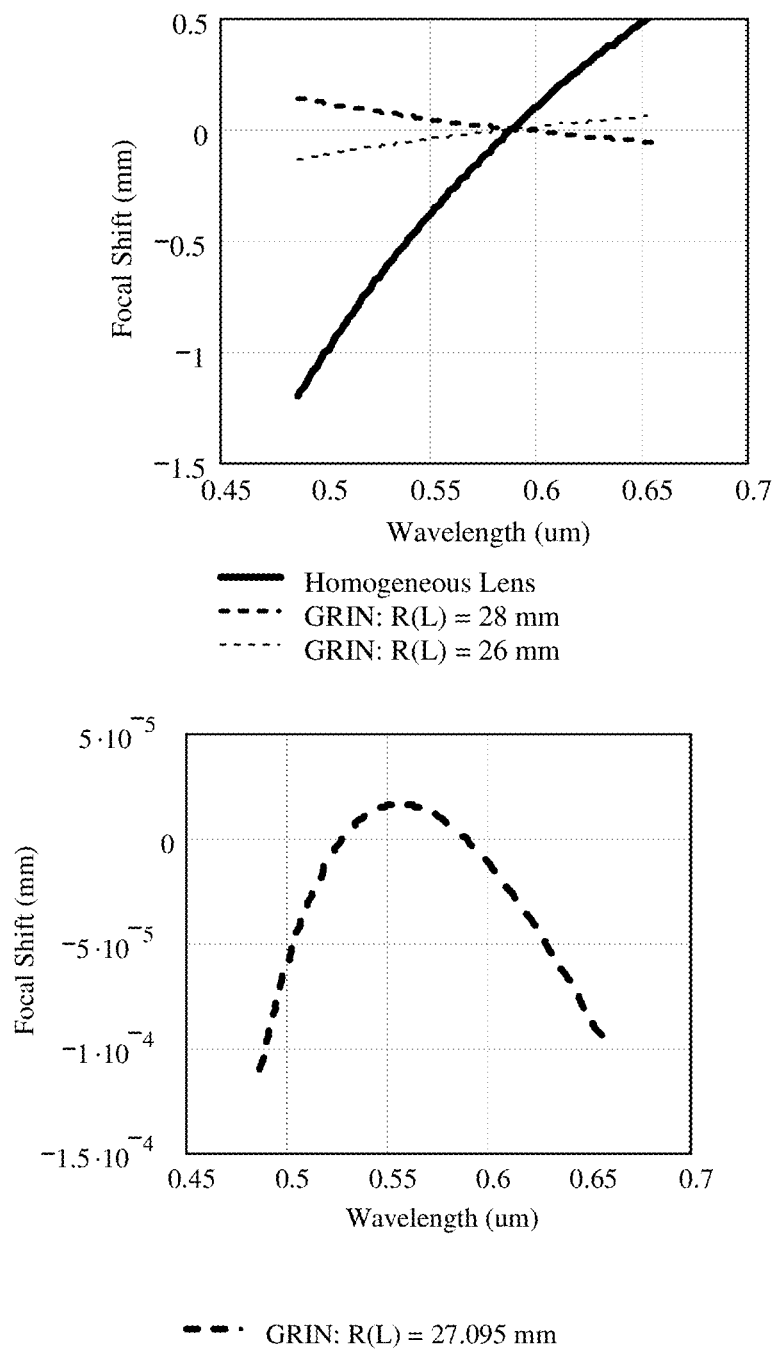
FIG. 2 illustrates a computed longitudinal focal shifts as a function of wavelength. Plots are for a single homogeneous lens (solid line) and for several GRIN lenses. On the right is the GRIN achromat, plotted on vertical scale 10,000× smaller than the plot on the left.

The simulated chromatic focusing properties of the homogeneous lens, the model GRIN lens, and GRIN lenses with slightly-altered front surface curvature are all plotted in FIG. 2. The plots show the location of the paraxial image plane, relative to the d-line image plane, as a function of wavelength across the visible region of the spectrum. The solid line shows the chromatic aberration expected of a conventional singlet: blue light focuses in front of red light. From the F-line (486.1 nm) to the C-line (656.3 nm) the difference in focal position is 1.7 mm By contrast, the gradient index in the model GRIN lens (with $R_L$=28 mm as predicted by Eqn. (10)) overcorrects the chromatic aberration. The lens acts as if it were constructed of material with anomalous dispersion: blue light focuses behind the red light with a focal shift of −0.2 mm, much smaller than the focal shift of the conventional lens. The discrepancy between the raytraced results and the expected achromatic behavior is due to deviations in the real lens from the thin lens approximation made in the derivations. Increasing the chromatic power of the surface by curving more strongly ($R_L$=26 mm) changes the balance back to a normal sign. The GRIN achromat is found at an intermediate value, $R_L$=27.095 mm This lens exhibits a maximum paraxial focal shift less than 0.14 μm across the visible spectrum.

Since the state of the art requires two lenses to fabricate an achromatic lens, this invention has the capability of reducing the lens count in multi-element imaging systems by up to a factor of two. Furthermore, the concepts outlined in this invention can be extended beyond the simple test case presented in this document.

Many modifications and variations of the present invention are possible in light of the above teachings. It is therefore to be understood that the claimed invention may be practiced otherwise than as specifically described. Any reference to claim elements in the singular, e.g., using the articles "a," "an," "the," or "said" is not construed as limiting the element to the singular.

What we claim is:

1. A method of making an achromatic gradient index singlet lens comprising:
   utilizing a gradient index material with a curved front surface in which light does not follow a straight line as it travels through the material and wherein different color rays traverse different curved paths;
   utilizing the natural dispersion of the curved front surface as a strong positive lens; and
   developing a weakly diverging GRIN distribution within the lens to balance the chromatic aberrations of the curved front surface.

2. The method of claim 1 wherein the achromatic gradient index singlet lens has equal focal lengths at $\lambda_{red}$ and $\lambda_{blue}$ and can be represented by $$R_L = R_G \frac{\Delta n_o}{\Delta n_o - \Delta n_b}$$

wherein $R_L$ is the radius of curvature of the lens surface wherein $R_G$ is the distance from the vertex to the lens center of symmetry wherein $\Delta n_o = [n_o(\lambda_{blue}) - n_o(\lambda_{red})]$ and wherein $n_o$ is the index of refraction at the lens vertex wherein $\Delta n_b = [n_b(\lambda_{blue}) - n_b(\lambda_{red})]$ and wherein $n_b$ is the index of refraction at the back vertex of the lens.

3. The method of claim 1 wherein the achromatic gradient index singlet lens utilizes focal lengths at two different wavelengths while maintaining an unchanged overall focal length.

4. The method of claim 1 resulting in an achromatic gradient index singlet lens wherein $R_L = 27.095$ mm.

5. The method of claim 4 wherein the achromatic gradient index singlet lens exhibits a maximum paraxial focal shift less than 0.14 μm across the visible spectrum.

6. An achromatic gradient index singlet lens comprising a gradient index material with a curved front surface in which light does not follow a straight line as it travels through the material and wherein different color rays traverse different curved paths;
   wherein the natural dispersion of the curved front surface acts as a strong positive lens; and
   wherein the lens comprises a weakly diverging GRIN distribution to balance the chromatic aberrations of the curved front surface.

7. The achromatic gradient index singlet lens of claim 6 wherein focal lengths at two different wavelengths are utilized while maintaining an unchanged overall focal length.

* * * * *